Figure 1:
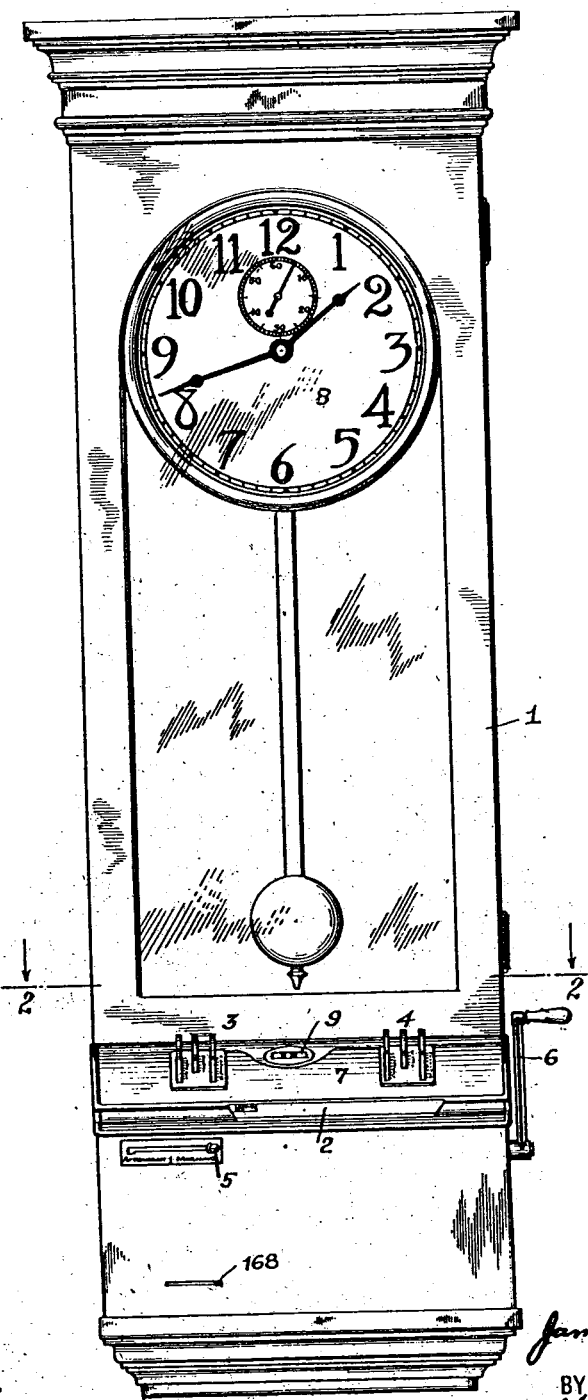

J. W. BRYCE.
ELAPSED TIME RECORDER.
APPLICATION FILED MAR. 29, 1913.

1,184,721.

Patented May 30, 1916.
15 SHEETS—SHEET 1.

WITNESSES:
George Schlott
John O. Gempler

INVENTOR,
James Wares Bryce
BY
Kenyon & Kenyon.
his ATTORNEYS

J. W. BRYCE.
ELAPSED TIME RECORDER.
APPLICATION FILED MAR. 29, 1913.

1,184,721. Patented May 30, 1916.
15 SHEETS—SHEET 5.

INVENTOR,
James Wares Bryce,
BY
Kenyon & Kenyon,
his ATTORNEYS.

J. W. BRYCE.
ELAPSED TIME RECORDER.
APPLICATION FILED MAR. 29, 1913.

1,184,721.

Patented May 30, 1916.
15 SHEETS—SHEET 7.

WITNESSES:

INVENTOR,
James Ware Bryce,
BY Kenyon & Kenyon
his ATTORNEYS.

J. W. BRYCE.
ELAPSED TIME RECORDER.
APPLICATION FILED MAR. 29, 1913.

1,184,721.

Patented May 30, 1916.
15 SHEETS—SHEET 8.

J. W. BRYCE.
ELAPSED TIME RECORDER.
APPLICATION FILED MAR. 29, 1913.

1,184,721.

Patented May 30, 1916.
15 SHEETS—SHEET 11.

*Fig. 11.*

J. W. BRYCE.
ELAPSED TIME RECORDER.
APPLICATION FILED MAR. 29, 1913.

1,184,721.

Patented May 30, 1916.
15 SHEETS—SHEET 12.

WITNESSES:
George Schlatt
John O. Templer

INVENTOR,
James Wares Bryce
BY
Kenyon & Kenyon
his ATTORNEYS.

J. W. BRYCE.
ELAPSED TIME RECORDER.
APPLICATION FILED MAR. 29, 1913.

1,184,721.

Patented May 30, 1916.
15 SHEETS—SHEET 13.

WITNESSES:
George Schlott
John O. Templer

INVENTOR,
James Wares Bryce,
BY
Kenyon & Kenyon
his ATTORNEYS

J. W. BRYCE.
ELAPSED TIME RECORDER.
APPLICATION FILED MAR. 29, 1913.
1,184,721.
Patented May 30, 1916.
15 SHEETS—SHEET 14.
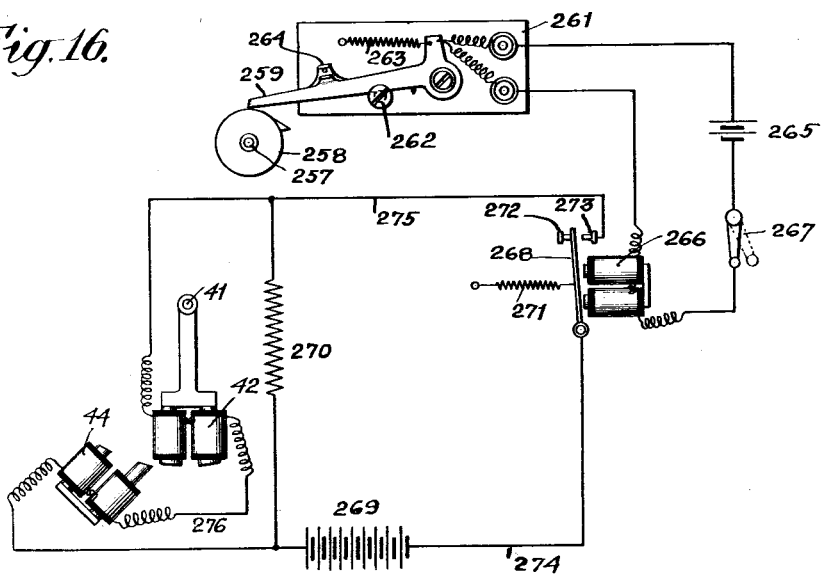
Fig. 16.
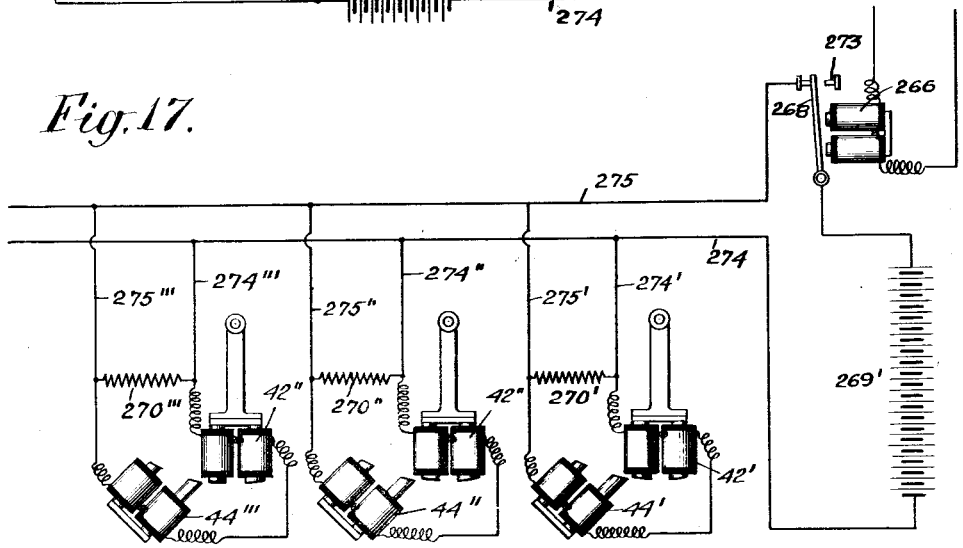
Fig. 17.
Fig. 18.
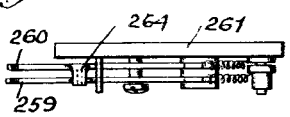

J. W. BRYCE.
ELAPSED TIME RECORDER.
APPLICATION FILED MAR. 29, 1913.

1,184,721.

Patented May 30, 1916.
15 SHEETS—SHEET 15.

*Fig. 19.*

| | Morning | | | Afternoon | | |
|---|---|---|---|---|---|---|
| | IN | OUT | E.T. | IN | OUT | E.T. |
| Mon | | | | | | |
| Tues | | | | | | |
| Wed | | | | | | |
| Thur | 7 20 | | | | | |
| Fri | | | | | | |
| Sat | | | | | | |
| Sun | | | | | | |

Total Time _____
Rate __40 cts__ Amount _____
Shop Order No __3060__ Date __July 21 '10__
Aritcle No __H243__ Lot No __6__
Operation __Drill__
Employe No __20__ No of Pieces __106__

*Fig. 20.*

| | Morning | | | Afternoon | | |
|---|---|---|---|---|---|---|
| | IN | OUT | E.T. | IN | OUT | E.T. |
| Mon | | | | | | |
| Tues | | | | | | |
| Wed | | | 14 | | | |
| Thur | 7 20 | 8 42 | | | | |
| Fri | 7 20 | 8 42 | 13 | 1 22 | | 15 |
| Sat | | | | | | |
| Sun | | | | | | |

Total Time _____
Rate _____ Amount _____
Shop Order No _____ Date _____
Article No _____ Lot No _____
Operation _____
Employe No _____ No of Pieces ____

*Fig. 21.*

THIS SIDE OUT

WITNESSES:
George Schlott
John O. Gempler

INVENTOR
James Wares Bryce
BY
Kenyon & Kenyon
his ATTORNEYS

UNITED STATES PATENT OFFICE.

JAMES WARES BRYCE, OF BLOOMFIELD, NEW JERSEY, ASSIGNOR TO INTERNATIONAL TIME RECORDING COMPANY OF NEW YORK, OF ENDICOTT, NEW YORK, A CORPORATION OF NEW YORK.

ELAPSED-TIME RECORDER.

1,184,721.     Specification of Letters Patent.     Patented May 30, 1916.

Application filed March 29, 1913. Serial No. 757,489.

*To all whom it may concern:*

Be it known that I, JAMES WARES BRYCE, a citizen of the United States, and a resident of Bloomfield, in the county of Essex and State of New Jersey, have invented a new and useful Improvement in Elapsed-Time Recorders, of which the following is a specification.

My invention relates to elapsed time recorders.

It has for its object to provide an elapsed time recorder capable of being operated manually by workmen; and such a recorder simple in construction and easily operated; also, one that, along with the record of elapsed time, will also give a record of the true time of each operation for purposes, among other things, of verification.

In the drawings accompanying this specification and forming part hereof, I have shown my invention in its preferred form and will now proceed to describe such embodiment of my invention.

Figure 2:
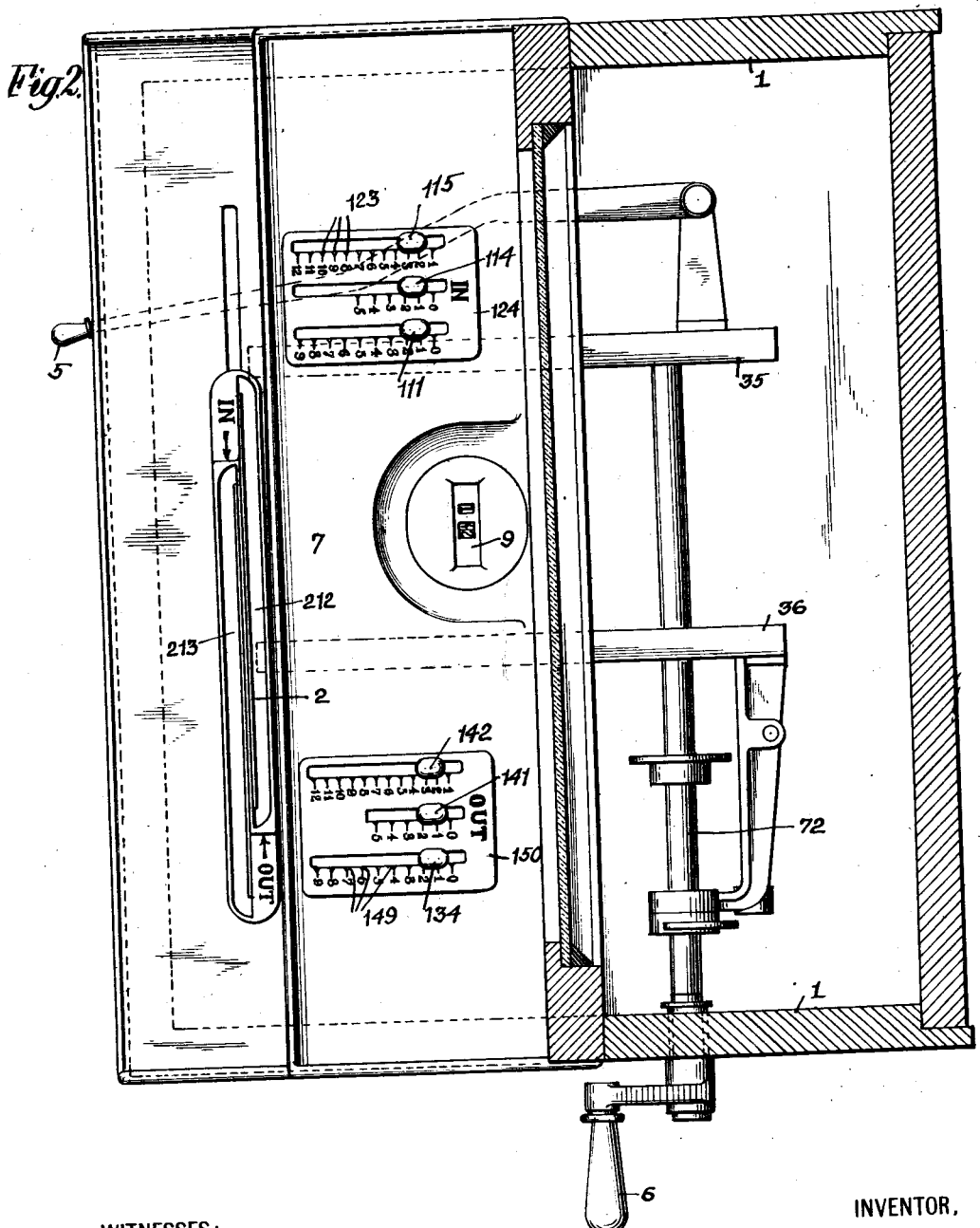
Figure 3:
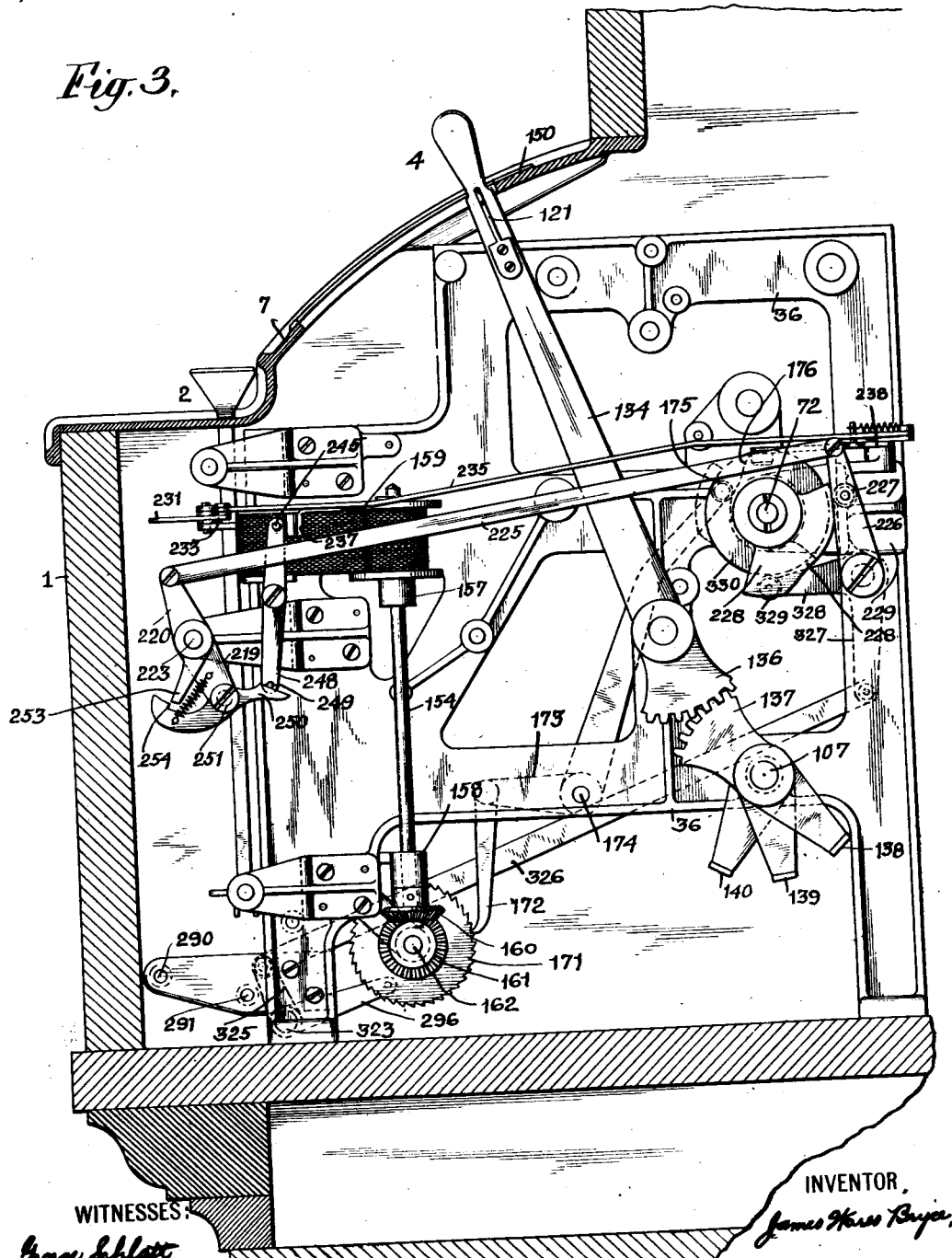
Figure 4:
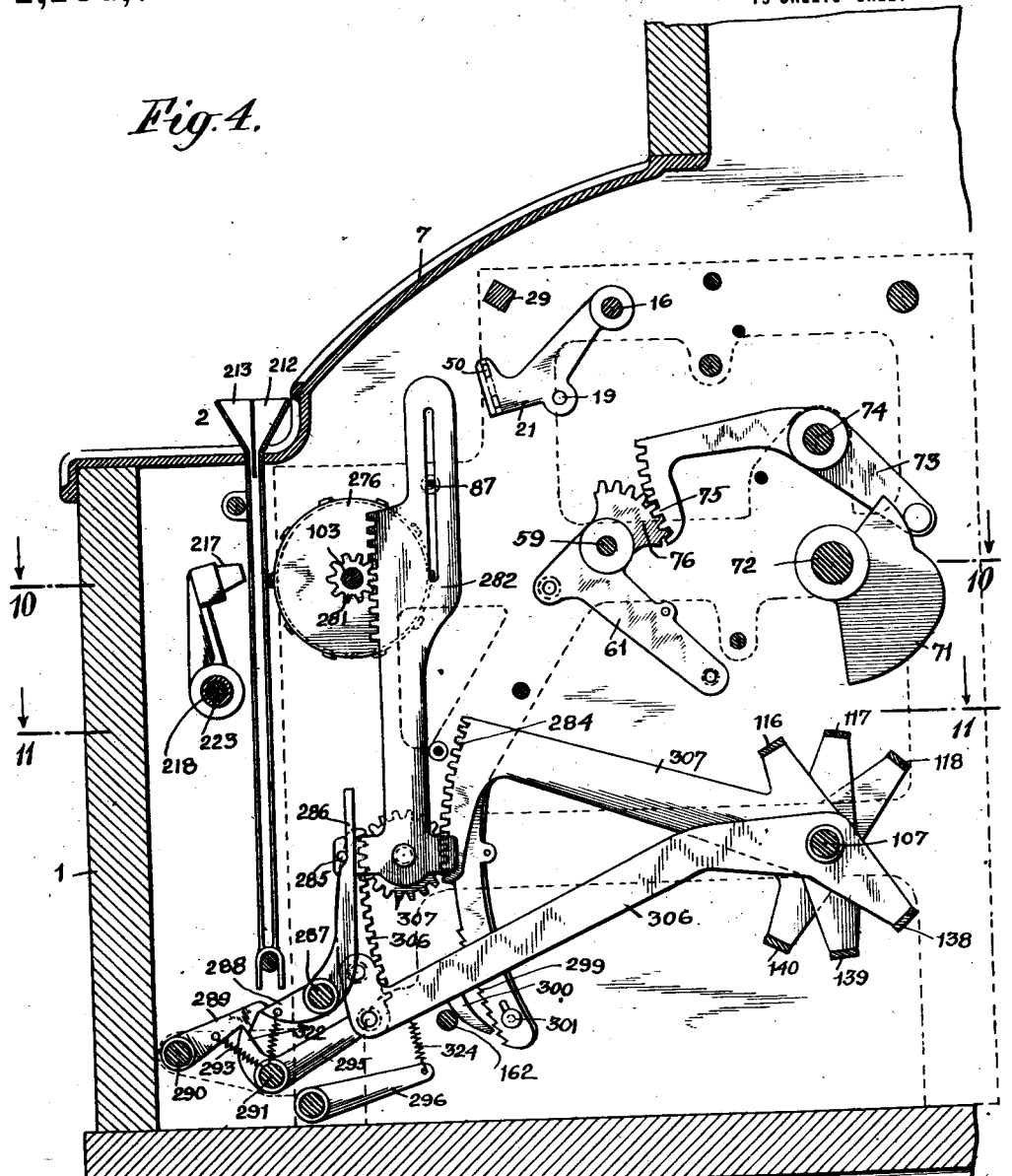
Figure 8:
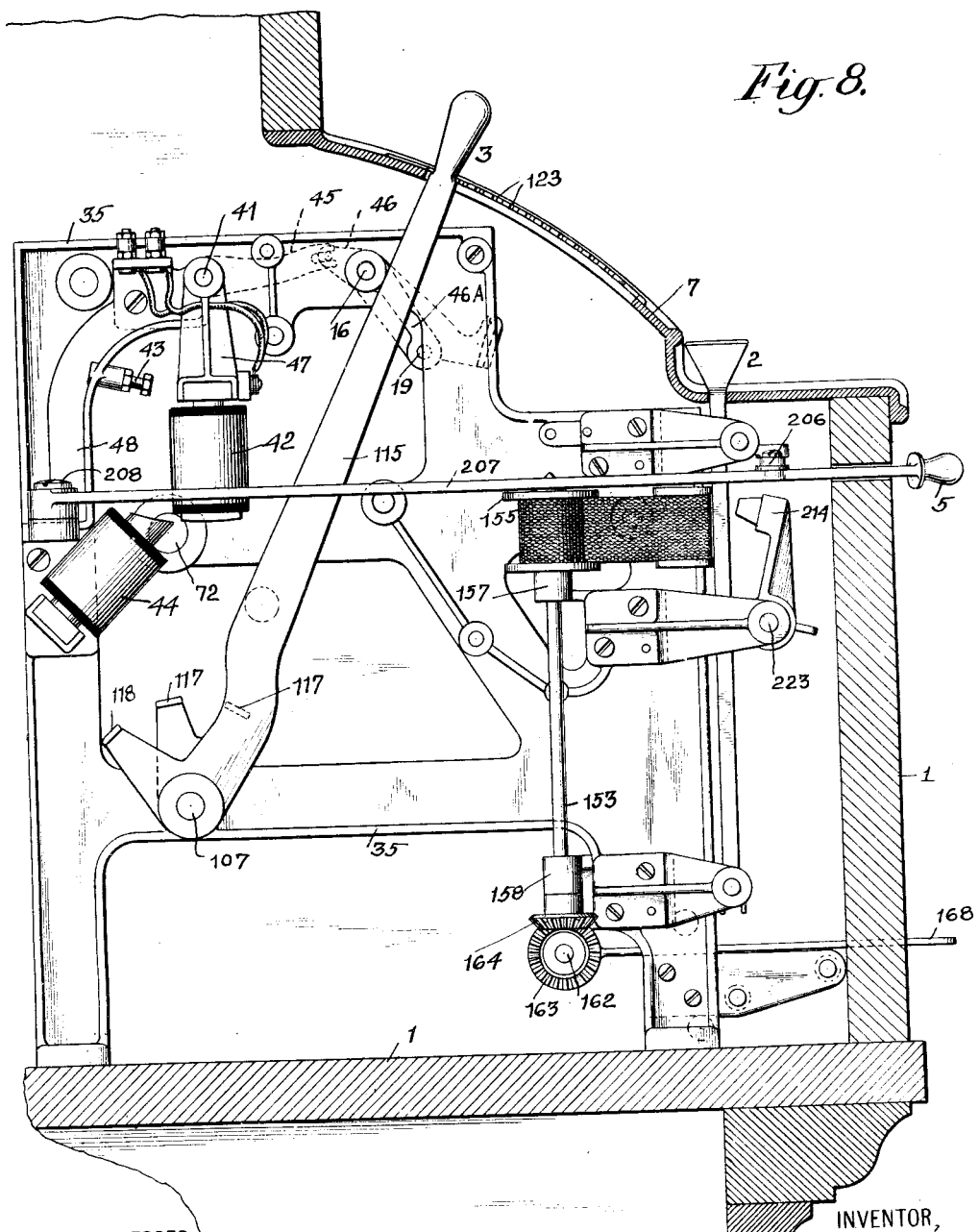
Figure 9:
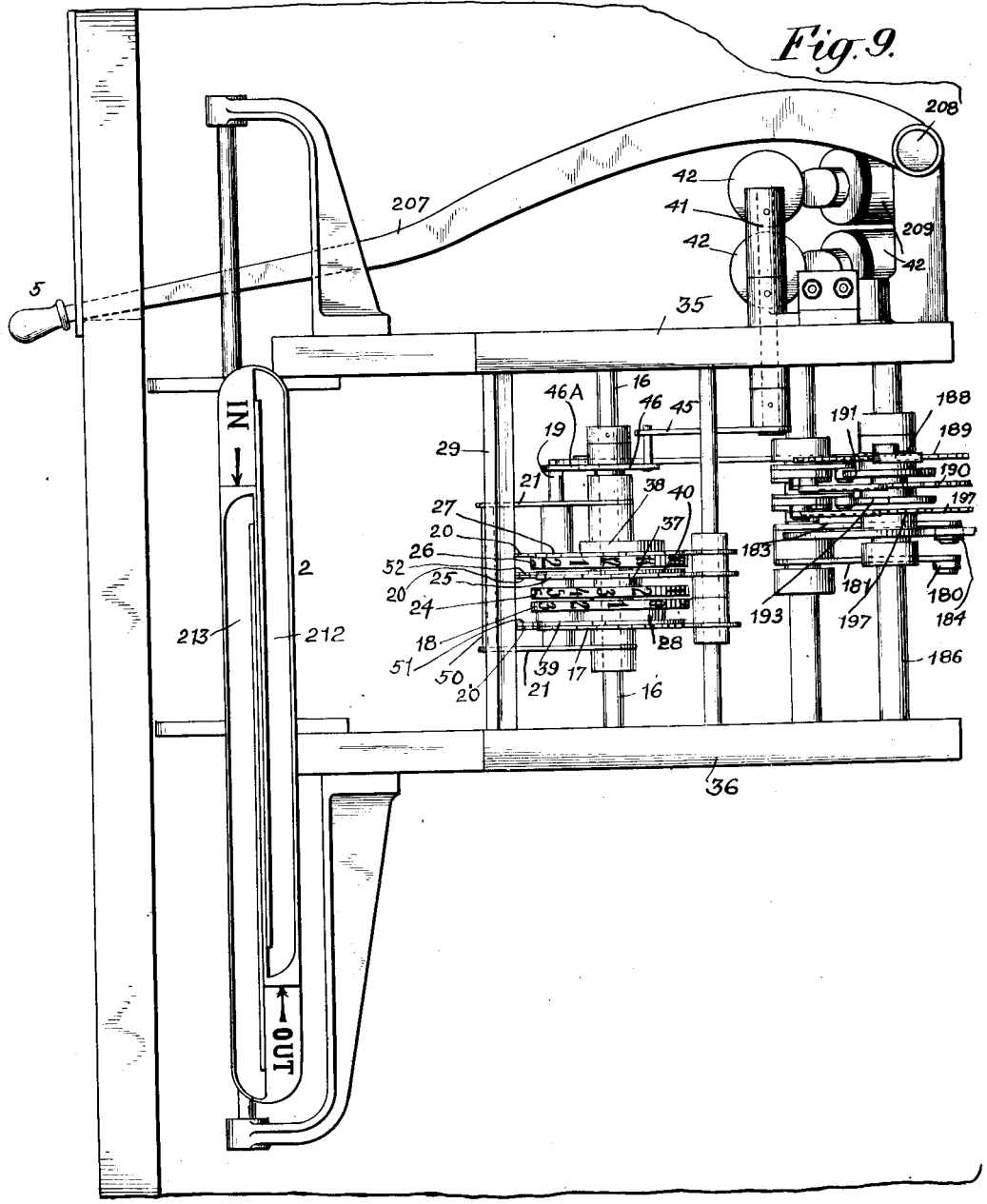
Figure 10:
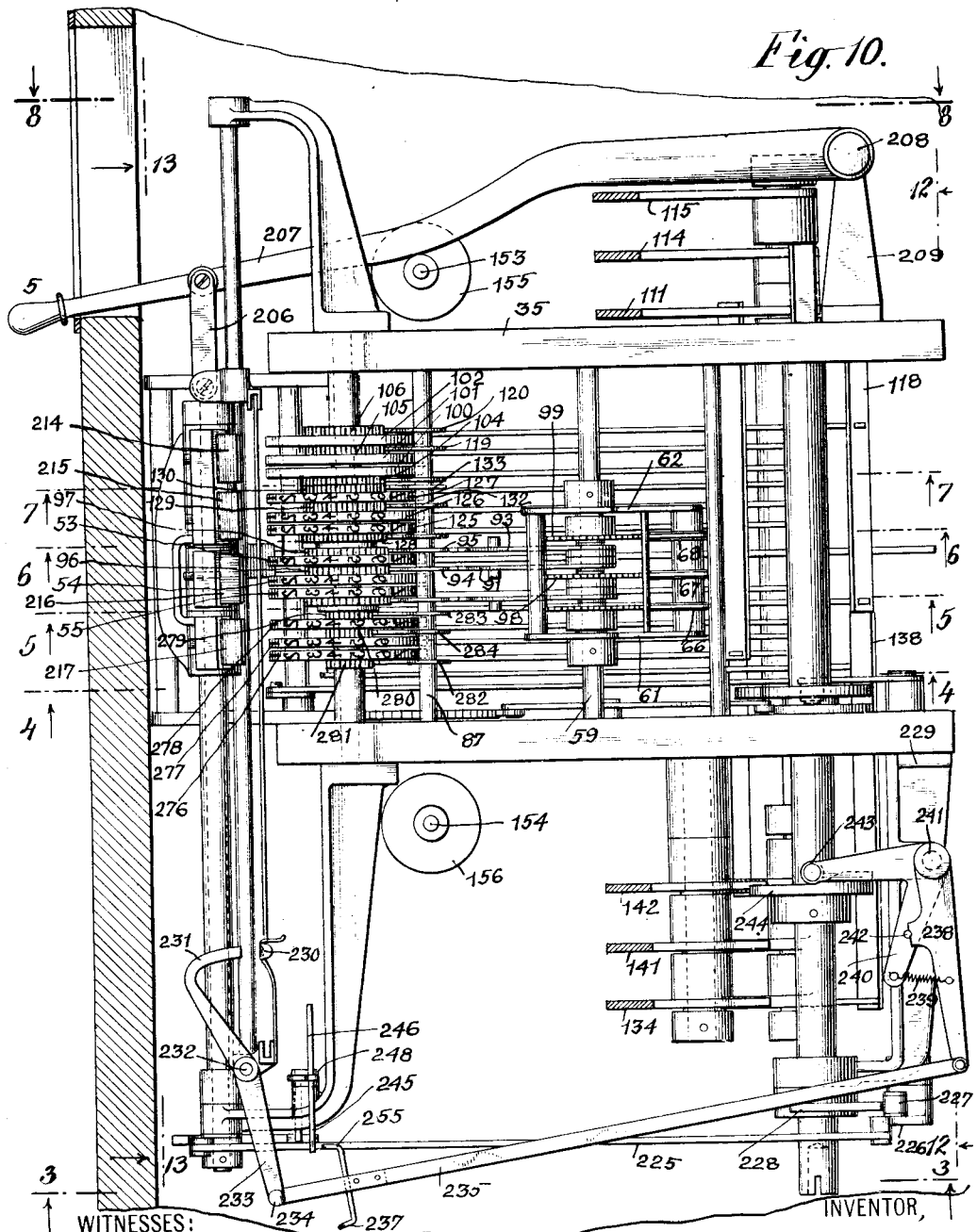
Figure 12:
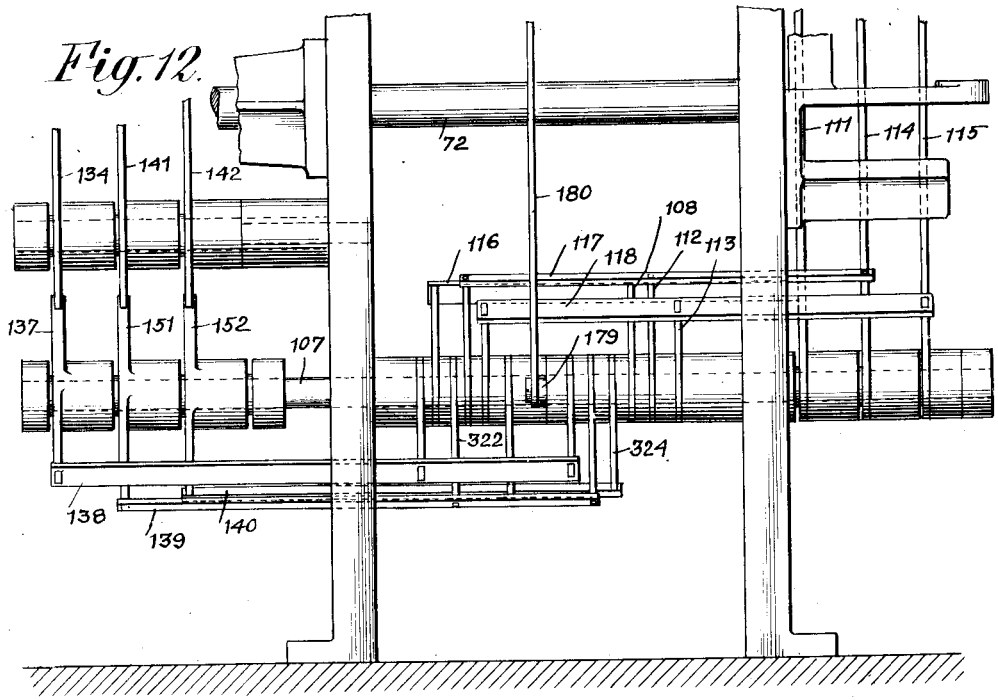
Figure 13:
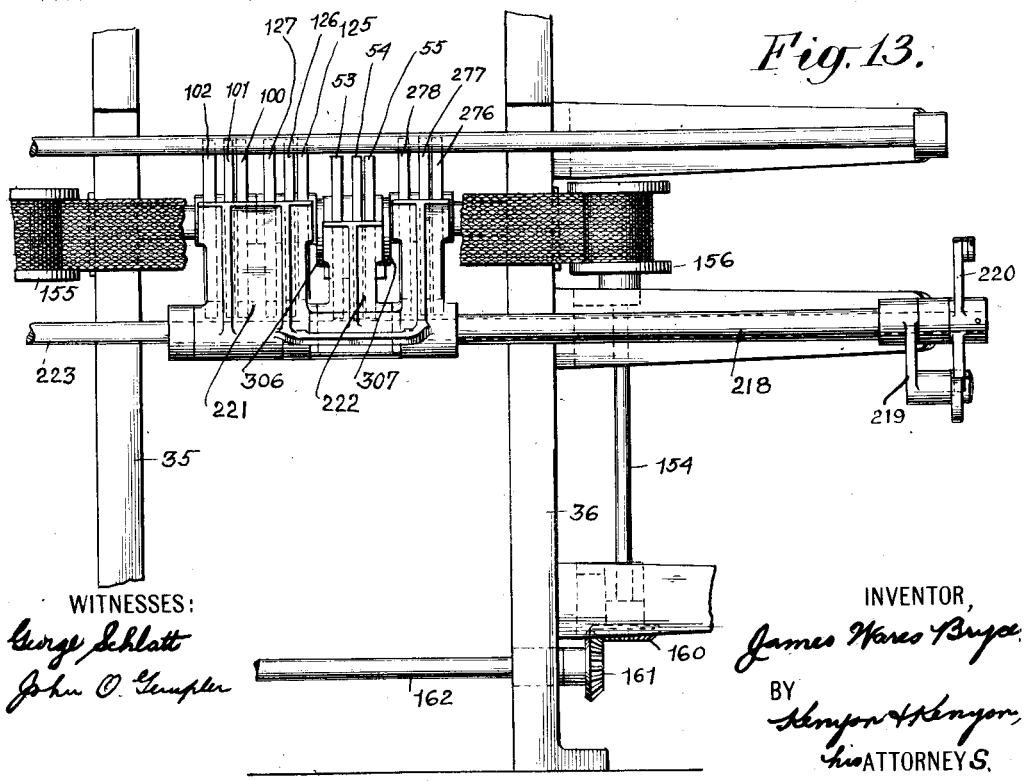
Figure 14:
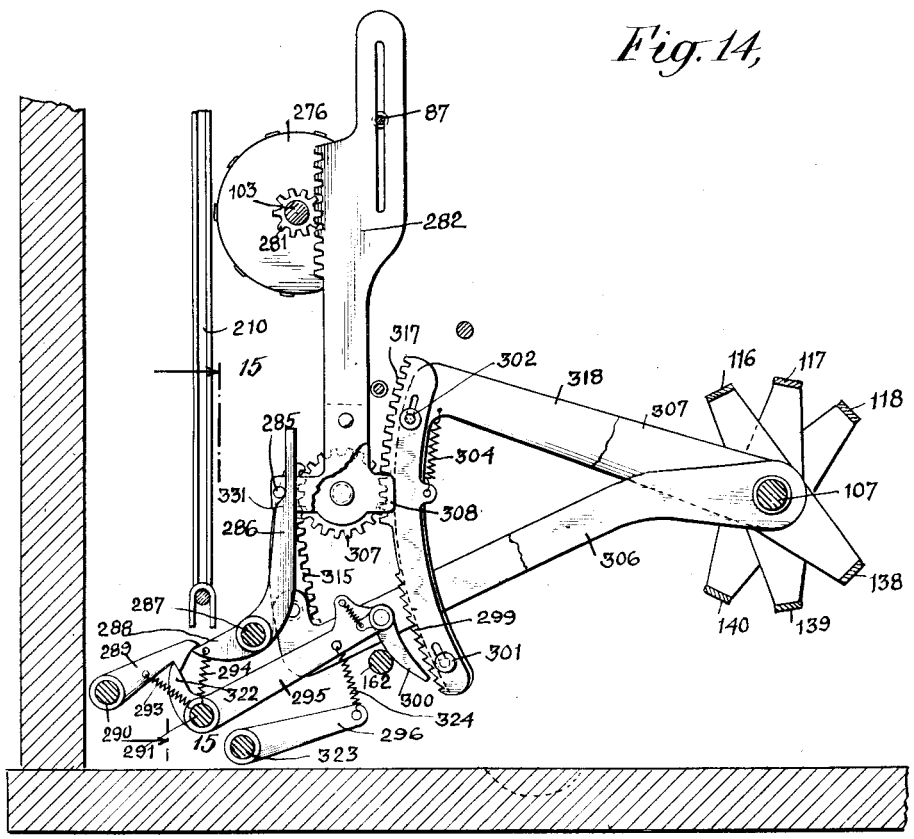
Figure 15:
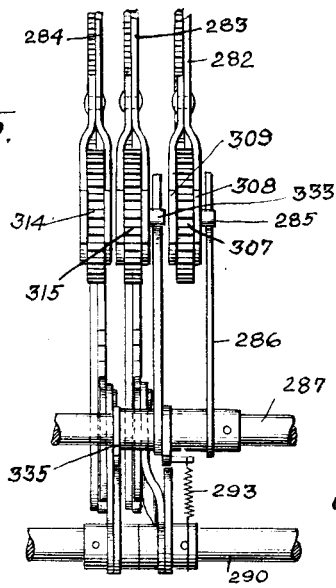

Referring to the drawings, Figure 1 is a front elevation of an elapsed time recorder embodying my invention; Fig. 2 is a horizontal section on the line 2—2 of Fig. 1; Fig. 3 is a vertical section on the line 3—3 of Fig. 10, showing the mechanism in side elevation; Figs. 4, 5, 6, 7 and 8 are vertical sections on the lines 4—4, 5—5, 6—6, 7—7 and 8—8 of Fig. 10; Fig. 8 shows the mechanism in side elevation looked at in the opposite direction of the section of Fig. 3 on line 8—8 of Fig. 10; Fig. 9 is a plan view of the mechanism with certain parts omitted; Figs. 10 and 11 are horizontal sections on the lines 10—10 and 11—11 of Fig. 4; Fig. 12 is a front view of the lower portion of the mechanism looking in the direction of the arrows and taken on the line 12—12 of Fig. 10; Fig. 13 is a rear view of the lower portion of the mechanism looking in the direction of the arrows and taken on line 13—13 of Fig. 10 and with certain parts broken away; Fig. 14 is a detail vertical section of the elapsed time mechanism; Fig. 15 is a detail front view of the differential gears; Fig. 16 is a diagram showing the circuits for running a single elapsed time mechanism; Fig. 17 is a diagram showing the circuits for running a number of such mechanisms; Fig. 18 is a top view of a contact device; Figs. 19, 20 and 21 are views of the recording card preferably employed; Fig. 19 is a view after the first or "in" operation, Fig. 20 a view after the second or "out" operation, and Fig. 21 a view of one end of the reverse side of the recording card.

Before proceeding to describe the various parts of the machine in detail, I will first briefly point out some of the more prominent parts of the mechanism, and will describe briefly what the workman does in operating the machine on both the "in" and "out" operations, and what is accomplished at each operation.

The casing 1 of the machine is provided with a clock movement 8 in its upper part (Fig. 1). In the lower part of the case is a rounded top plate 7 which contains an opening 9 through which are visible the time of day wheels 18, 24 and 26, representing the minutes, tens of minutes and hours, respectively. These wheels are driven by the clock movement to represent time of day. The top plate 7 is provided with two banks of levers, levers 3 for the "in" time and levers 4 for the "out" time. It is also provided near its lower edge with a card receiver 2, the slot of which contains two divisions, division 213 for the "in" operation and slot 212 for the "out" operation. The recording card used is illustrated in Figs. 19, 20 and 21, and is provided in the usual way with vertical and horizontal columns, half of the vertical columns being devoted to the morning and the other half to the afternoon. Each half of the card has a vertical column for the "in" time, two vertical columns for the "out" time, and a vertical column for the elapsed time. The horizontal columns are for the different days of the week, each day having two horizontal columns opposite it. The card receiver 2 is adjustable horizontally so as to occupy any one of four positions, and it is manually moved by the workman to any one of these positions by means of a lever 5 projecting through the lower part of the casing (Fig. 1). In the position of the lever 5 in Fig. 1 the card receiver 2 is at its extreme right-hand position, which represents the position for an "in" operation in the morning. A movement of lever 5 to the left-hand position brings it into position for the "in" operation for the afternoon. At the bottom of the card receiver is a shelf 177 (Fig. 5) for supporting the card. This is automatically movable upward once each day, controlled by the clock movement for bringing the proper horizontal space, representing the appropriate day of the week, opposite the printing line.

Four sets of recording wheels are provided (Fig. 10), the left-hand ones 100, 101, 102 for the "in" wheels representing minutes, tens of minutes and hours, respectively, "out" wheels 125, 126 and 127; time of day wheels 55, 54 and 53; and elapsed time type wheels 276, 277 and 278. The time of day wheels are arranged half of a daily space above the other three sets of wheels, so that the printing of the time of day takes place upon the upper horizontal column opposite each day of the week, and the printing from the other three sets of wheels takes place upon the card at the lower of the two horizontal columns opposite each day of the week (see Fig. 20).

At the right-hand of casing 1 is the operating handle 6 (Fig. 1).

The operation by a workman, of the machine, is as follows: In the "in" operation, which may either be when the workman enters for the morning or afternoon, or at the beginning of a job, he places his card 10 in the card receiver. If it is an "in" operation, he places it in the "in" division of the card receiver with the top down and its face toward the machine. He then sets the lever 5 to its proper horizontal position. If it is for an "in" operation in the morning, he places the lever 5 at the extreme right-hand position shown in position 1, if it is not already there. He then pulls operating handle 6. This prints the "in" time in the "in" morning column in the upper horizontal space opposite the appropriate day. In the example shown, this time is represented at 7.20 in the "in" column of the morning for Thursday, and in the upper horizontal space opposite that day, as shown at 11, Fig. 20. When the job, for example, is completed, the workman places his card 10 in the "out" division 212 of the card receiver 2. In the example shown, the time being 8.42 a. m., he puts the card in the "out" slot in the same manner as when performing the "in" operation. He then sets the three "in" levers 3 at the appropriate places along their slots representing the "in" time, 7.20, by moving the three handles 111, 114 and 115 until they are opposite zero, 2 and 7, respectively, in the column of figures shown on the plate 124 on the top plate 7. He then sets the three "out" levers 4 at the appropriate points representing the "out" time, which he ascertains by looking through the opening 9 at the indicating wheels 18, 24 and 26, by moving the handles 134, 141 and 142 opposite the numbers 2, 4 and 8, respectively, on the series of figures on plate 150. The setting of the respective levers 3 and 4 has moved the elapsed time type wheels to a position representing the elapsed time between the "in" time and the "out" time, levers 4 moving these elapsed time type wheels in one direction a distance representing the time of the "out" operation, 8.42, and the movement of the "in" levers 3 moving the elapsed time type wheels in the reverse or subtracting direction, a distance represented by 7.20, the resultant between the two movements giving the elapsed time between them, namely, 1.22, and bringing type representing the latter number upon the printing line. The workman then pulls handle 6. This operates the mechanism of the machine and causes to be printed upon the card numbers representing the type then standing upon the printing line, namely, the time of the "in" operation, 7.20, the time of the "out" operation, 8.42, and the elapsed time, 1.22, to be printed upon the card at 12, 13 and 15, respectively, in the lower horizontal column opposite Thursday, and also causes 8.42, the "out" time, to be also printed in the upper horizontal column opposite Thursday, as shown at 14, Fig. 20. The complete record thus printed contains the "in" and "out" time printed in the upper horizontal column, and the same time also to be printed in the lower horizontal column, together with the elapsed time. This double printing of the "in" and "out" time constitutes a verification of the accuracy of the operation by the workman. Any mistake by him can be detected by a glance at the card.

If the operations take place in the afternoon, precisely the same course is followed, except that the workman moves lever 5 to the left as indicated in Fig. 1, instead of to the original position, as described above.

I will now proceed to describe in detail the different parts of the machine and the mode of operation.

*The indicating time wheels and the time of day cam mechanism.*—These are more particularly illustrated in Figs. 1, 5, 6, 8, 9 and 10.

The indicating wheels are visible through window 9 and are for the purpose, more particularly, of indicating the true time to the workman to enable him to properly operate the "out" levers in accordance with true time. These indicating wheels are mounted loosely on shaft 16 secured in the side frames 35, 36 of the framework (Fig. 9). Three of them are shown. The minute indicating wheel 18, the tens of minutes wheel 24 and the hour wheel 26. These wheels are clock-controlled. Any suitable means for this purpose may be employed. That shown consists of an electrically operated impulse device consisting of magnets 42 and 44 and their connecting parts (Fig. 8), controlled in their operation by the clock movement 8. This mechanism will now be described.

Mounted integral with minute indicating wheel 18 is a minute time of day cam 28, a minute ratchet 17 and a wiper disk 39. Similarly mounted with the tens of minutes indicating wheel 24 are tens of minutes time of day cam 37 (Fig. 9), ratchet 25 and wiper disk 40. Similarly, the hour indicating wheel 26 is provided with cam 38, and ratchet 27.

The indicating wheels and time of day cams are fed forward intermittently by the impulse device consisting of magnets 42 and 44. 42 is carried by arm 47 pivoted to rock shaft 41 (Fig. 8). This magnet is free to swing on shaft 41. 44 is a stationary magnet mounted on plate 48 forming part of the framework.

43 is an adjustable stop on plate 48 to prevent magnet 42 from swinging beyond a predetermined point.

Figure 5:
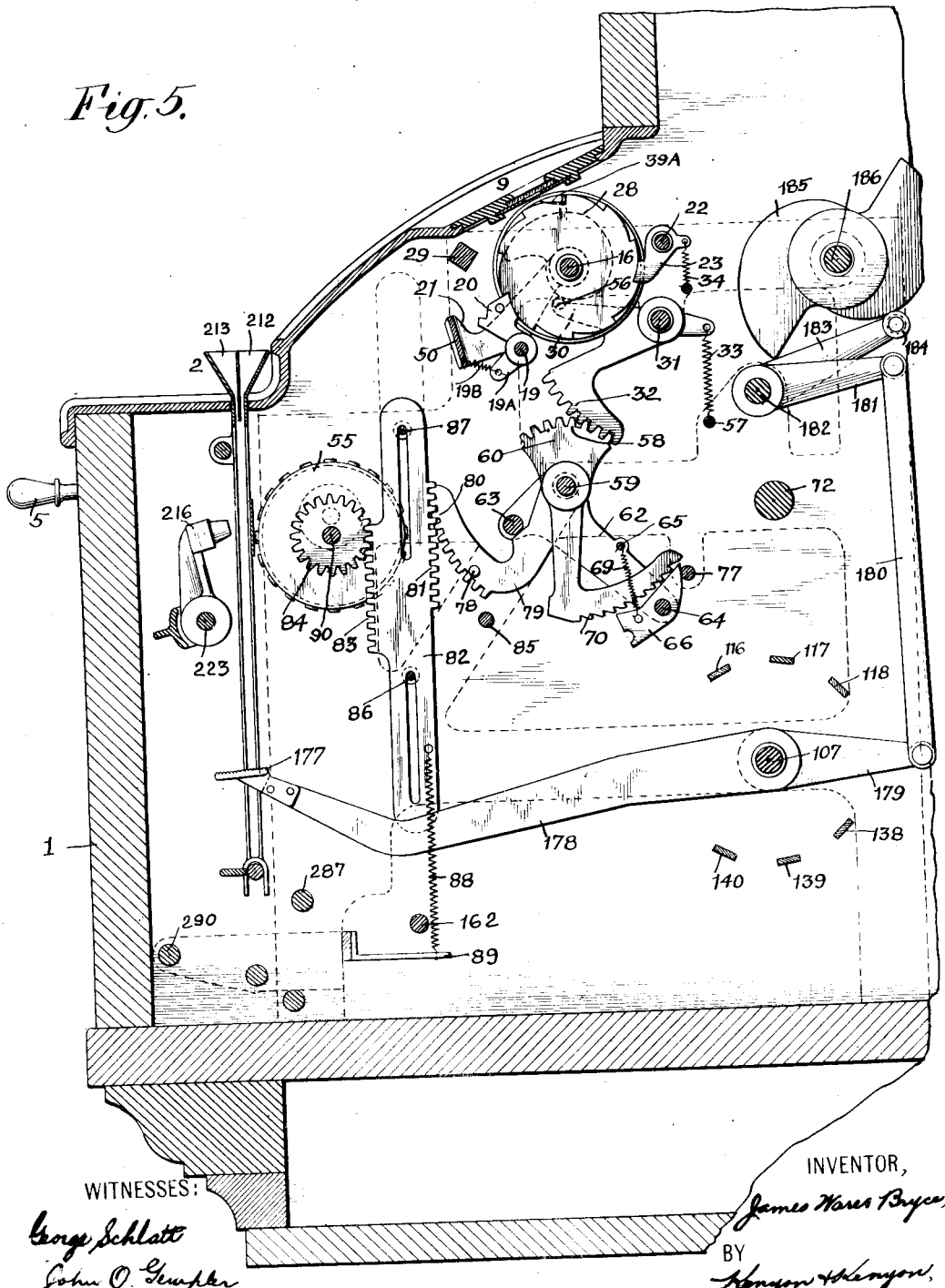

Rock shaft 41 is journaled in side frames 35, and on its inner end is mounted an arm 45 which coacts with a pin 49 on arm 46, the latter loosely pivoted on shaft 16. Lever 46 has an extending arm 46ᴬ which engages an extension of pawl shaft 19, the latter securely fastened in the pawl frames 21, 21. The pawl frames consist of side plates 21, 21 loosely pivoted on shaft 16, having a cross plate 50 securing the side plates together. Pawl shaft 19 carries pawls 20, 20, one for each of the ratchets 17, 25 and 27. Each pawl 20 is loosely mounted on shaft 19 and has an extension 19ᴬ, and each pawl is normally held in engagement with its corresponding ratchet wheel by means of a spring 19ᴮ secured to the end of 19ᴬ and connected with cross plate 50 (Fig. 5). Mounted on rod 22 are stop pawls 23, 23, one for each of the said three ratchets, each pawl normally held in engagement with its ratchet by means of a spring 34.

29 is a cross bar to act as a stop or limit to the upward swinging movement of side plates 21 and cross plate 50.

Whenever the electromagnets 44 and 42 are energized, the arm 47 is moved through an arc until it strikes stop 43. In the machine shown the magnets are energized and deënergized every minute, as will be explained later on. When arm 47 is moved, rock shaft 41 moves arm 45 which, in turn, acts on pin 49 of lever 46, rocking pawl frames 21, 21 upward, carrying with them feeding pawls 20, 20, and causing any one of these pawls, if in engagement with its corresponding ratchet, to feed the ratchet and the corresponding indicating wheel and time of day cam one point.

Pawl 20 of the minute ratchet wheel 17 is always in engagement with that wheel, being held there by spring 19ᴮ, and every energization of magnets 42, 44, which would occur once every minute, feeds forward the ratchet wheel and its corresponding indicating wheel and cam. Pawls 20 of the tens of minutes and of the hour indicating wheels and cams are, on the contrary, normally held out of engagement with their respective ratchets 25, 27, but at the end of a complete revolution of the ratchet wheel, cam and indicating wheel of the next lower denomination, each one of these pawls is momentarily let into engagement with its ratchet wheel, and at the succeeding energization of magnets 42, 44, feeds forward its indicating wheel and cam one point, when it is again removed from engagement with its ratchet. For this purpose each of the indicating wheels, except the highest, has a wiper disk fast with it, 39 for the minute wheel and 40 for the tens of minutes. Each of these disks is provided with a notch, as shown in dotted lines at 39ᴬ (Fig. 5). Pawl 20 of the next higher denomination is provided with a finger fast to its sleeve, having a projection extending sidewise and resting upon the wiper disk of the next lower denomination. 52 is the finger of pawl 20 of the hour ratchet wheel resting upon the minute wiper disk 40, and 51 is the corresponding finger of the pawl 20 of the tens of minutes ratchet wheel, and it rests against the minute wiper disk 39. By these means each wheel carries one to the wheel of next higher denomination at each revolution of the former.

By the above means the indicating time wheels and the time of day cams always indicate by their position the true time.

*Connections between the time of day cams and the time of day recording type wheels.*— These are specially illustrated in Figs. 4, 5, 9 and 10. There are three time of day recording type wheels shown. Minute wheel 55, tens of minutes wheel 54, and hour wheel 53 (Fig. 10). These type wheels stand normally at zero; that is, with zero on the printing line. At each operation of the machine by handle 6 these type wheels are rotated a distance corresponding with the then conditions of the timing cams 28, 37 and 38, respectively, previously described as connected with the indicating wheels 18, 24 and 26, respectively. As previously described, these timing cams are continuously rotated by means of the magnets 42 and 44 controlled by the clock movement 8, and their condition at any time represents the true time in minutes, tens of minutes and hours. The operation of handle 6 and the connecting mechanism between these timing cams and the time of day recording type wheels causes each type wheel to be moved a distance corresponding to the then condition of the corresponding time of day cam, and that type is brought upon the printing line which corresponds to the time represented by the position of the timing cam. As the connection from each timing cam to its type wheel is the same in each case, I will describe that connecting the minute cam 28 with the minute time of day type wheel 55, as shown in Fig. 5. In the position of the parts represented in Fig. 5, cam 28 is shown as standing at the figure "2", representing two minutes.

30 is a bell crank lever loosely pivoted on stationary shaft 31 secured to the side frames of the machine and carrying at its end a roller 56 normally bearing upon the surface of cam 28, through spring 33 secured to the framework at 57. It will be understood that there is, of course, a corresponding lever similarly mounted on shaft 31 for each cam. Lever 30 is provided at its lower end with gear teeth 32 meshing with gear teeth 58 on sector 60 loosely mounted on shaft 59 secured in the framework. Sector 60 has a series of ratchet teeth 70 at its lower end. The position of sector ratchet 60 will, of course, at any time be dependent upon the position of timing cam 28. Sector 60 is rotated in the direction of the hands of the clock at each operation of the machine by handle 6 by mechanism having always the same extent of movement or stroke. This mechanism consists of a frame composed of two arms 61 and 62 (Figs. 5 and 10) connected by a universal bar 63 and also connected by a small rod 65 and a shaft 64 upon which are loosely mounted pawls 66, one for each sector ratchet. Pawl 67 for the tens of minutes and pawl 68 for the hour ratchet. Frames 61, 62 are mounted fast upon shaft 59. A spring 69 is provided for each pawl secured at one end to rod 55, and normally holds its pawl in engagement with the teeth 70 of the sector ratchet. Similar springs are (not shown) provided for the other pawls.

Shaft 59 is rocked at each movement of handle 6 by means of cam 71 (Fig. 4) on the main cam shaft 72. Cam 71 coacts with a roller on the end of lever 73 loosely mounted on stationary shaft 74 and carrying at its other end gear teeth 75 meshing with sector 76 which forms an integral part of side arm 61. The movement of shaft 59 rocks frames 61, 62 carrying with them pawls 66, 67 and 68 and moving them toward the left as viewed in Fig. 5. This movement of frame 61, 62 is always of the same extent. At the extreme right-hand end of the movement the pawls strike a stop bar 77 rocking them and disengaging the pawls from the teeth 70 of the sector ratchets. In all other positions of the frame 61, 62 the springs hold the pawls in engagement with the teeth 70.

Immediately after the commencement of the leftward movement of frame 61, 62 during the actuation of handle 6, the pawls 66, 67 and 68 engage their respective sector ratchets, and each pawl moves its corresponding sector to the left a distance corresponding with the leftward movement of the pawl. But the particular tooth 70 of the sector ratchet 60 which the pawl engages with will depend upon the position of the timing cam. In the position of the parts shown in Fig. 5, pawl 66 when released from bar 77, will engage with the second tooth 70 of the ratchet sector 60 as timing cam 28 stands at its second position. As will be understood, it will, of course, move the sector ratchet 60 a farther distance than if the timing cam stood at a higher position. In the course of the movement of sector ratchet 60 the lower part will engage a pin 78 on sector 79 loosely mounted on shaft 59, and will rotate that sector in the direction of the hands of the clock. This movement is limited by stop rod 85 which comes in contact with the nose of each pawl. With the timing cam at zero, the left-hand end of the lower part of sector 60 is just nine points distant from pin 78. Accordingly, the extent of movement of sector 79 is likewise dependent upon the position of the timing cam.

Gear teeth 80 on sector 79 mesh with rack teeth 81 on sliding rack 82 guided on rods 86, 87 mounted in the side frames 35, 36. These rods 86 and 87 project through slots in all of the other sliding racks, it being understood that each time type wheel has a similar sliding rack and connections. The slots are long enough to permit rack 82 to move upward a distance corresponding to nine units, and to do this in a straight line. Rack 82 stands normally in its lowermost position, and is held there by means of a light tension spring 88 fastened to a spring anchorage 89 supported by the side frames. A series of teeth 83 cut in the opposite side of sliding rack 82, engaging with spur gear 84 fast to the minute recording type wheel 55, which latter is loosely mounted on shaft 90.

The extent of the upward movement of sliding rack 82 will depend upon the position of time of day cam 28, and type wheel 55 will be rotated a corresponding distance, bringing upon the printing line the type representing the minute corresponding to the position of the timing cam 28 at the operation of the machine. In this way the time of day type wheels are set at each operation of the machine at the time of day when the machine is operated, and when the printing hammers are actuated, the time is printed upon the card inserted in the card receiver.

The tens of minutes type wheel 54 and the hour wheel 53 are each provided with a similar pawl, sector ratchet, gear sector, sliding rack and gear. The tens of minutes type wheel 54 has gear 96, sliding rack 94, gear sector 91, sector 98 and pawl 67. Those of the hour wheel 53 are gear 97, sliding rack 95, gear sector 93, sector 99 and pawl 68.

At each of the above operations each lever 30 will be removed from its cam, keeping its roller out of contact with the cam during the entire printing operation. No matter how long this operation takes, cam 28 is free to be continuously rotated in accordance with the time, without any interference by the other parts connecting it with the type wheel. When the printing operation is completed, the roller of lever 30 is returned to its position against cam 28, and will then represent the true minute.

It will be noted that the time of day type wheels 53, 54 and 55 are set on a lower lever than the other sets of recording type wheels, namely, the "in" type wheels, the "out" type wheels, and the elapsed time type wheels. This is accomplished by having that portion of the type wheel shaft 103 supported by side plates 306, 307, as shown in Fig. 13. The object of this arrangement is to bring the time of day type wheels opposite the proper printing space on the card, namely, the upper horizontal column opposite each day.

*The "in" time of day type wheels and their connections with the "in" time of day levers.*—These are specially illustrated in Figs. 1, 2, 7-12. There are three "in" time of day type wheels, 100, 101, 102, representing the minutes, tens of minutes and hours (Fig. 10). These wheels print the "in" time on the second or "out" operation of the machine. As shown in Fig. 20, this is printed in the lower half of the first column of the morning opposite "Thur.," as "7.20." These type wheels stand normally at zero and are moved by the "in" levers 3. In the second or "out" operation of the machine, the workman, among other things, moves the three "in" levers 3 to the hour, tens of minutes and minutes represented at the moment of operation by the time indicating wheels 18, 24 and 26, as seen through window 9. This is done by the workman moving handles 111, 114, 115 of the "in" levers 3 opposite to the number on the scale alongside of the slot of the lever corresponding to the minute, tens of minutes, and hour of the true time (see Fig. 2). This moves the "in" wheels correspondingly so as to bring upon the printing line type representing the same hour, tens of minutes and minutes. Any suitable connections between the handles of the levers and the type wheels may be employed. That shown I will now proceed to describe.

To each of the "in" type wheels is fastened a gear, 104 the gear of the minute type wheel 100, 105 the gear of the tens of minutes type wheel 101, and 106 the gear of the hour type wheel 102. Meshing with the minute type wheel gear 104 is a vertically sliding rack 109 (Fig. 7) sliding on stationary rod 87 and having its lower end pivotally secured to a lever 108 loosely mounted on stationary shaft 107 secured in the side frames 35 and 36. Lever 108 has an arm 122 to which is riveted a cross over 116 the other end of which is secured to the minute operating lever 3. This lever 3 has secured to it near its upper end a detent, not shown, but similar to detent 121 secured to one of the "out" levers 4 (see Fig. 3). This detent is a spring arm fast at one end to the lever and with its free end engaging with the notches 123 in the side of the slot of the "in" index plate 124 (Fig. 2). The tens of minutes "in" type wheel and the hour "in" type wheel have similar racks, levers, cross overs and operating levers. Those of the tens of minutes type wheel 101 are, gear 105, rack 119, lever 112, cross over 117, and corresponding operating "in" lever 114. The hour "in" type wheel 102 has gear 106, rack 120, lever 113, cross over 118, and corresponding operating "in" lever 115. Each "in" lever has a detent similar to detent 121 on "out" lever 4 adapted to engage with the notches of the corresponding slot in plate 124.

In the illustration shown in the machine, a workman, in the "out" operation, would move the handles of the "in" levers 3 as follows: handle 115 opposite the number "7" on its index, handle 114 opposite to the number "2," and handle 111 opposite zero. The corresponding type wheels 102, 101 and 100 would be moved by the means above described so as to stand with the type "7.20" on the printing line, and that number would be printed on the record card as shown at 12, Fig. 20. The movement of the "in" levers 3 by the workman also affects the elapsed time type wheels, causing them to move in a subtracting direction a distance in accordance with the time at which the "in" levers are set, namely, 7.20. For this reason, the cross overs 116, 117 and 118 extend across the machine and connect with the mechanism operating the elapsed time type wheels, as will be hereinafter described.

*The "out" time type wheels and their connections with the "out" levers.*—These are specially illustrated in Figs. 1, 2, 3, 6, 10 and 11. There are three "out" time of day type wheels, 125, 126 and 127, being respectively the minute, tens of minutes and hour wheels. These type wheels stand normally at zero and are moved by means of the "out" levers 4. In each "out" operation of the machine by a workman he moves the three "out" levers 4 by means of their operating handles 134, 141 and 142 to a position on their respective scales representing the hour, tens of minutes and minute of the time of the "out" operation of the machine, as shown by the time indicating wheels through the window 9. In the illustration given in the machine, the time of the "out" operation was 8.42 in the morning. Accordingly, the workman moves the handles 142, 141 and 134 opposite the numerals 8, 4 and 2 on the respective scales. This moves the corresponding "out" time wheels 127, 126 and 125, so that the numerals 8, 4, 2 stand upon the printing line; and when the handle 6 is pulled by the workman in the "out" operation those numbers are printed by the "out" time wheels upon the card in the first vertical "out" column and in the lower half of it as shown at 13 in Fig. 20. Any suitable means for connecting the "out" levers 4 with the "out" time type wheels may be employed. I will now describe that shown in the particular machine of the drawings. Each of these "out" time type wheels has a gear fastened to it; 128 for the minute type wheel 125, 129 the gear for the tens of minutes wheel 126, and 130 the gear for the hour wheel 127. Meshing with the minute gear 128 are the teeth 132 of rack 131. This rack is adapted to slide vertically on stationary rod 87 secured in the framework, and at its lower end is pivotally secured to a lever 148 loosely mounted on stationary shaft 107. Lever 148 has an arm 110 to which is fastened a cross over 138 which, at its other end has secured to it a sector 137 loosely mounted on stationary shaft 107 and provided with gear teeth at its upper end (Fig. 3). Certain of these parts are outside of side frame 36, as shown in Fig. 11. The teeth of sector 137 mesh with the teeth of sector 136 which is integral and forms part of minute "out" lever 134. This lever is loosely mounted on stud 136 fastened to the side frame 36. 121 is a spring detent secured to the side of lever 4 near its upper end and adapted to engage with the notches 149 on the side of the minute slot of the "out" plate 150 (Fig. 2). 134, 141 and 142 are the handles of the three "out" levers 4. The hour type wheel and tens of minutes type wheel of the "out" time have similar racks, levers, cross overs and sectors connecting with the "out" levers. Those connected with the tens of minutes type wheel 126 are gear 129, rack 132, lever 146, cross over 139, sector 151, and tens of minutes "out" lever 141. Those connected with the hour "out" time wheel 127 are gear 130, rack 133, lever 147, cross over 140 and sector 152, connecting with the tens of minutes "out" lever 142. Each lever 4 has a detent similar to 121 which engages with the notches in the side of its corresponding slot in plate 150.

The racks 131, 132 and 133 move up to set the "out" type wheels, and the racks 109, 119 and 120 move down to set the "in" type wheels. For this reason, the "out" levers 4 are constructed with sectors meshing with sectors on the levers themselves so as to reverse the movement of the type wheels. This permits the levers 4 on the front of the machine to be pulled downward or toward the workman exactly the same way as are the "in" levers.

The movement of the "out" levers by the workman not only sets the "out" time type wheels at a position corresponding to the second or "out" operation of the machine, but they also move the elapsed time type wheels in an adding direction a distance representing the time of the second or "out" operation, as will be presently described. For this reason, cross overs 138, 139 and 140 are connected with the elapsed time type wheels, as will be presently described.

*Elapsed time type wheels and their connections with the "in" and "out" levers.—* These are specially illustrated in Figs. 3, 4, 10, 11 and 14. Three elapsed time type wheels are shown; 276 the minute wheel, 277 the tens of minutes, and 278 the hour. They stand normally at zero and are moved upon the operation of the "in" and "out" levers, the "out" levers moving them in one direction a distance representing the "out" time, and the "in" levers moving them in the reverse direction a distance representing the "in" time, the resultant of the two movements of the elapsed time type wheels causing them to indicate the elapsed time between the "in" and "out" operation, and this resultant movement of the wheels brings upon the printing line type representing such elapsed time. Upon the operation of handle 6 at the "out" operation of the machine, these type print the elapsed time in the elapsed time column of the card, as shown, for instance, at 115, where the elapsed time, "1.22", is printed, being the elapsed time between the time of the "in" operation, 7.20, and the time of the "out" operation, 8.42. The elapsed time type wheels are on the same level with the "in" time and the "out" time type wheels, and print upon the lower half of the space devoted to the day of the week, as shown in Fig. 20.

Any suitable connections may be used between the elapsed time type wheels and the "in" and "out" levers causing one set of levers to move the wheels one way and the other set of levers to move them the reverse way, so that the resultant position of the elapsed time type wheels will indicate the elapsed time between the two operations. The particular connections shown in the drawings I will now describe.

Each elapsed time type wheel has secured to it a pinion. That of the minute type wheel 276 is pinion 281; that of the tens of minutes wheel 277 is pinion 280, and that of the hour type wheel 278 is pinion 279. Meshing with pinion 281 of the minute type wheel 276 is rack 282 supported at its upper end on rod 87 and carrying at its lower end a differential gear wheel 307 mounted between wing plates 308 and 309, the wing plate 308 being formed on the lower end of rack 282. This construction keeps the differential gear firmly in mesh with the sectors 284 and 306 hereinafter referred to. Meshing with differential 283 are gear teeth 284 on the out or external side of sector 307 loosely mounted on shaft 107. An extension 311 of sector 307 has firmly secured to it cross over 116 which, as above described, is attached to the "in" minute lever 3. Meshing with the opposite side of the differential gear 283 are the teeth of a sector 306 also loosely mounted on shaft 107. These teeth are arranged on the inner face of an upward extension of sector 306. Sector 306 has an extension 310 firmly secured to cross over 138 which, as before described, is attached to the minute "out" lever 4.

The tens of minutes elapsed time type wheel and the hour elapsed time type wheel have similar pinions, racks, differential gears, sectors and cross overs secured to the tens of minutes and hour "in" levers 3 and "out" levers 4. Those of the tens of minutes type wheel 277 are pinion 280, rack 284, differential gear 315, teeth 317 of sector 318, loosely mounted on shaft 107, extension 319, cross over 117 connected to the tens of minutes "in" levers 3, sector 312 secured to arm 321 loosely pivoted on shaft 107, extension 322, cross over 139, and tens of minutes "out" lever 141. Those connected with the elapsed time hour type wheel 278 are pinion 279, rack 283, differential 314, teeth 316 secured to sector arm 319 loosely mounted on shaft 107, extension 320, and cross over 118 connected to the hour "in" lever 115 and teeth 313 of sector arm 323 loosely pivoted on shaft 107, extension 324, and cross over 138 connected to the hour "out" lever 137.

From the preceding description it will be seen that the sectors, 284, 316 and 317 move downwardly when the "in" levers are moved by the workman, and that the opposing sectors 306, 312, 313 move upwardly when the "out" levers are moved. The effect of the downward movement of the first set of sectors is to tend to cause the differentials to roll downward upon the teeth of the opposing sectors, causing the elapsed time type wheels 276 to rotate clockwise. The upward movement of the sectors moved by the "out" levers, on the contrary, tends to roll the differential gears up upon the teeth of the opposing racks, and this tends to rotate the elapsed time type wheels in the reverse direction. The latter of these movements is a movement of the elapsed time type wheels in the adding direction, and the former is a movement in the subtracting direction. The resulting movement or position of the elapsed time type wheels, of course, will be the difference between the "out" time and the "in" time. In effect, it adds the "out" time upon the elapsed time type wheels and subtracts the "in" time, the resultant position being the difference between the two. These operations could be performed successively if desired, or simultaneously. In the machine shown they take place simultaneously. It will be understood, of course, that if the downwardly moving or "in" racks and the upwardly moving or "out" racks move at the same rate, the differential gears will remain in their normal or zero position, provided the rate of movement of the parts is the same. This will be true until one or the other of the sets of sectors stops, the continuing movement of the other, of course, moving the differentials and the elapsed time type wheels in accordance with such movement. In practice, the "out" and "in" sectors begin their movement at the same time, the "in" stopping first, as it always represents a less or earlier time, the "out" sectors continuing their movement until the "out" time is reached, the elapsed time type wheels indicating by the type on the printing line the difference in time between the two operations.

For purposes of clearness, the above description of the movement of the differential gears and the elapsed time type wheels has been given as if the sectors connected with the "in" levers were rigidly fixed to their supporting arms. The external sector 284 is an integral part of arm 307, but the tens of minutes external sector 317 is mounted on arm 318 by two studs 301 and 302, and is free to slide thereon, being provided with slots, but is held upwardly by spring 304; and it is provided at its lower end with a set of ratchet teeth 299 coacting with a pawl 300, as will be presently described, to assist in the purpose of borrowing one at the necessary time.

The differential gears stand normally at zero. In case any one of them gets below its normal or zero position, it will be necessary to borrow one from the elapsed time type wheel of the next higher order. Any suitable mechanism for this purpose may be used. I will now proceed to describe that shown in the drawings.

The side or wing plate 308 of differential rack 282 carries pin 285 which, when the differential gear is at its zero position, lies against the upper portion of lever 286 (Fig. 4), the latter lever being loosely mounted on shaft 287. Lever 286 has an extension or toe 288 at its lower end and a spring 294 for holding it in normal position against pin 285. Mounted on fixed shaft 290 is a lock pawl 289 held downwardly by spring 293. The pawl 289 has a tooth which engages a toe 322 on a bell crank lever 295 loosely mounted on shaft 291. Bell crank lever 295 carries at its outer end a pawl 300 capable of engaging the ratchet teeth 299 of the slidably mounted plate having external sector 317 and mounted on lever 318. Fixed to rock shaft 323 is an arm 296 which has fastened to it spring 324, the other end of the spring fastened to bell crank lever 295. Rock shaft 323 is rocked to the right (see Figs. 3 and 4) at each operation of handle 6. This is accomplished by means of lever arm 325 (Fig. 3) secured to rock shaft 323 and having its outer end pivotally connected to a link 326. Link 326 is connected at its other end to bell crank lever 327 mounted on the inside of side frame 36 and having an arm 328 which carries a cam roller 329 coacting with a cam 330 mounted on the main operating shaft 72. Each time that handle 6 is operated there is exerted a downward pull on spring 324 which tends to pull lever 295 in a downward direction, but as toe 322 is latched into pawl 289, lever 295 cannot move in a downward direction.

If in setting the "in" and "out" levers, a differential gear remains stationary or moves up, the above described parts remain in the positions described, and when lever 296 moves downward, spring 324 is merely stretched without pulling lever 295 downward, and pin 285 slides along the upright stem of subtractor lever 286. If, however, a differential gear moves downward, as, for example, gear 283, pin 285 rides up on cam surface 331 of lever 286 and rocks it on shaft 287 and toe 288 raises lock pawl 289, releasing toe 322. Now, when handle 6 is operated, lever 295 is pulled downward when the tension is exerted on spring 324. As lever 295 moves downward, pawl 300, which is normally held out of engagement with ratchet teeth 299 by spring 332, is forced by shaft 162 into engagement with ratchet teeth 299 and moves the sliding plate having the external sector teeth 317 downwardly one unit, whatever the particular position of the ratchet teeth may be. Moving the sliding plate downwardly one unit causes differential gear 307 to move downward with its differential rack 283 and rotate the tens of minutes type wheel 277 one point in a subtracting direction. Thus, whenever the minute differential 283 moves downward below its normal or zero position, one unit is subtracted from the tens of minutes type wheel. Exactly similar mechanism is provided between the tens of minutes differential and the hour elapsed time type wheel, in order to subtract one unit from the latter whenever the tens of minutes differential drops below its zero point. The tens of minutes differential rack 283 carries pin 333 coacting with lever 334, the latter having toe 335 mounted integral with it. The toe 335 when operating, unlatches lock pawl similar to 289 when handle 6 is operated, and lever 296 is moved. When differential 307 moves downward below the zero point, it therefore subtracts one unit from the hour type wheel 278. External sector 284 is made an integral part of lever 307, as no subtraction ever takes place on the minute type wheel. The hour differential rack 284 has no pin on its wing plate, as this is the column of highest order in the machine.

It is, of course, obvious that the capacity of the elapsed time recording mechanism can be indefinitely extended by adding one or more additional type wheels with their corresponding connecting and borrowing mechanisms, and also appropriate operating handles.

The mechanism above described thus shows elapsed time indicating mechanism, namely, elapsed time recording time type wheels and means manually controlled for causing the indicating or recording mechanism to indicate or record the elapsed time between two operations of the machine. This operation is entirely under the manual control of the operator through the "in" and 'out" sets of levers. The operation of one of these sets of levers moves the elapsed time recording mechanism one way in accordance with the time of operation of the machine as, for example, the "out" levers move the elapsed time type wheels one way, which is in an adding direction, a distance equal to the time of the "out" operation, and the other set of levers, the "in" levers, moves the elapsed time recording wheels the reverse way, i. e., in a subtracting direction a distance representing the time of an earlier operation of the machine, namely, the time of the so-called "in" operation. The operation one way is, in effect, an adding operation, and the operation the other way is a subtracting operation, and the resultant position of the elapsed time recording mechanism or type wheels represents the difference between the two times.

In the mechanism shown, an "out" lever and an "in" lever is provided for each elapsed time type wheel. Suitable means are provided for borrowing in the proper cases.

In the connections between the levers and the elapsed time type wheels, I preferably use a set of floating differential wheels one for each elapsed time type wheel, and these are normally at zero as shown, the two sets of levers operating the differential wheels one way or the other, and the differential wheels moving the elapsed time type wheels in accordance with their own movements; and I preferably arrange the borrowing mechanism so that it becomes operative whenever a floating differential falls below its zero or normal position.

In the machine shown, the "in" and the "out" levers manually operated by the workman, also operate respectively the "in" type wheels and the "out" type wheels, and cause these wheels at each operation of the machine to print upon the card in an appropriate place the time of the "in" and "out" operations, this being done primarily for purposes of checking or verification. I also preferably provide a set of time of day type wheels driven continuously and operated or controlled by a clock movement, and always at each operation of the machine printing the time of day, at one time in the "in" column and at the "out" operation in the "out" column of the card. By these means, a glance at the card will show whether the workman has accurately operated the machine, or has made a mistake.

Figure 6:
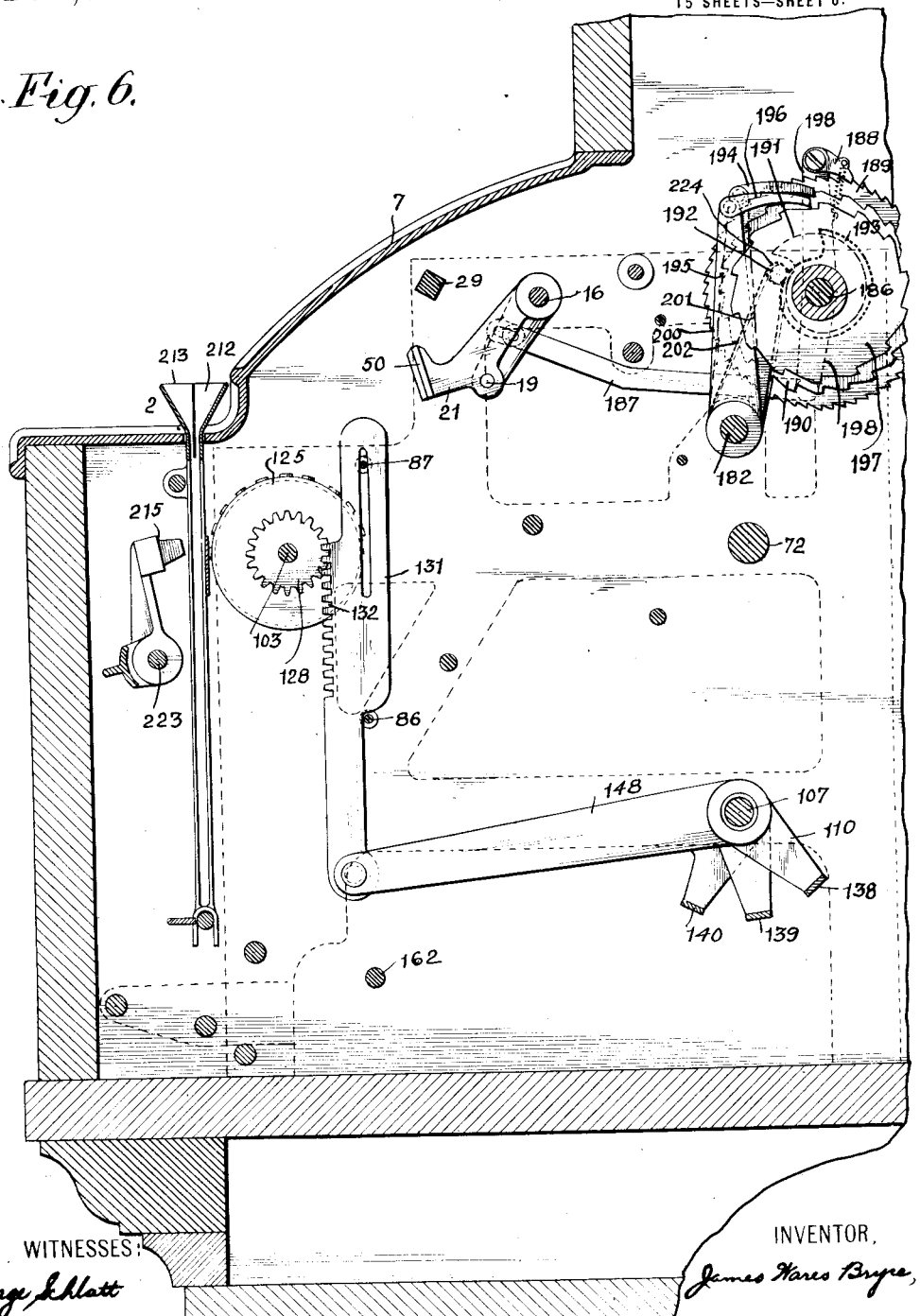
Figure 7:
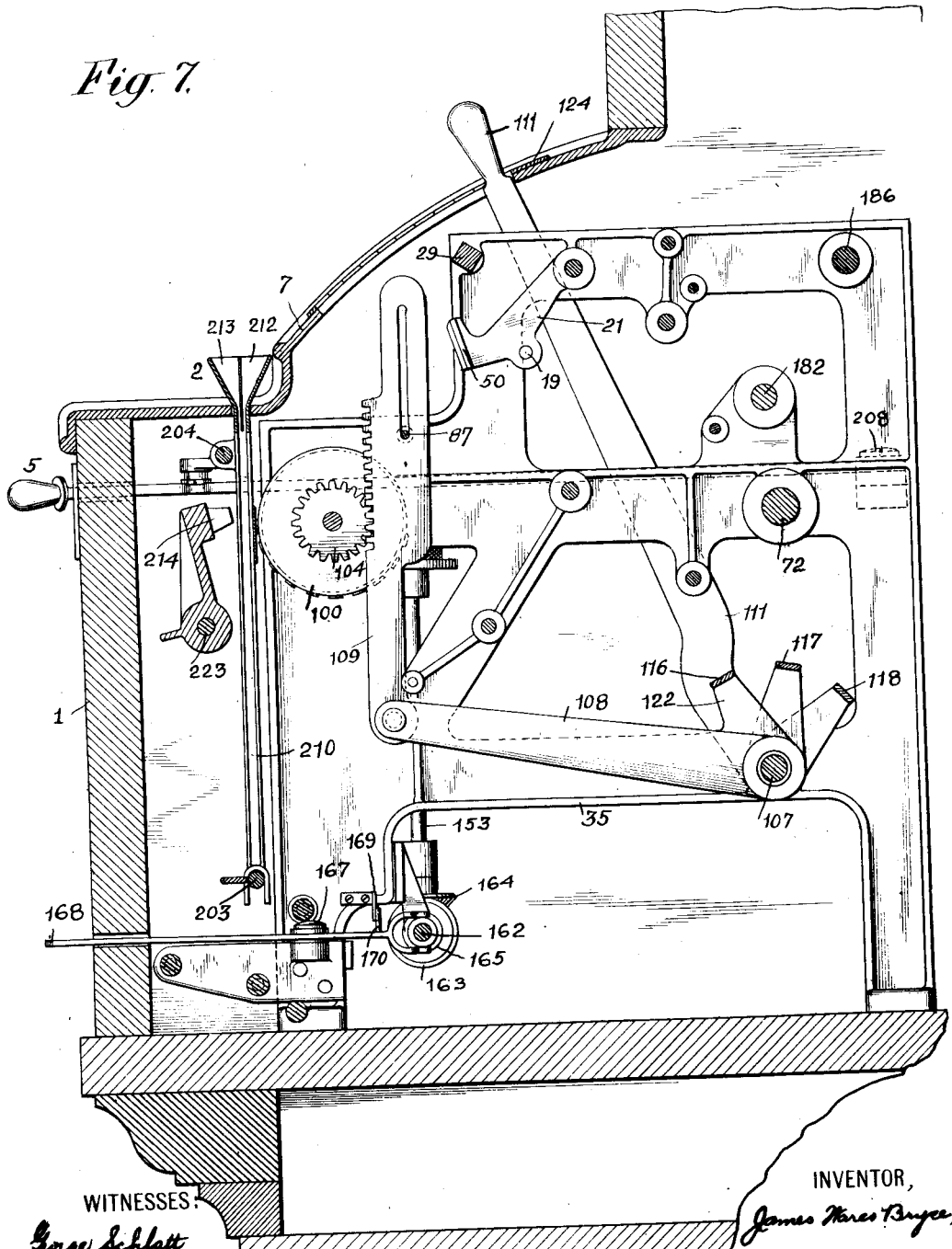

*The card abutment and its controlling mechanism.*—This is specially shown in Figs. 5, 6 and 11. The card abutment 177 is for the purpose of positioning the printing on the card as regards the days of the week, i. e., that Thursday's time will be put on the card in the Thursday space, as shown in Fig. 20. The card abutment 177 is fastened to one end of a lever 178 which is loosely mounted on shaft 107. An extension 179 is pivotally connected to a link 180 which has its other end pivoted to an arm 181 which is loosely mounted on shaft 182 fixed in the side frames 35 and 36.

Integral with arm 181 is arm 183 having at its outer end a cam roller 184 which coacts with a cam 185 mounted on shaft 186, which shaft is supported in the side frames of the mechanism. This cam 185 is revolved once in two weeks by a series of cams and ratchet wheels which will now be described. Connected to the side plate 21 of the pawl-carrying frame which operates the time of day index wheels and cams, is a link 187 (see Fig. 6) which is pivotally connected at its other end to a pawl lever 198 which is loosely mounted on shaft 186. At its upper end is a pawl 188 which operates a sixty-tooth ratchet 189.

As the pawl frame 21 operates each minute, the pawl 188 will move the ratchet 189 one tooth each minute and so it will revolve once each hour. Integral with this ratchet 189 is a cam 191 which has bearing against it the cam roller 192 mounted on one end of lever 201 which is loosely mounted on shaft 182. Integral with this lever 201 is an arm 195 which carries at its upper end a pawl 194 which serves to operate a twenty-four tooth ratchet 190. As the cam 191 is revolved once every hour the ratchet wheel 190 will be moved one tooth each hour or will revolve once every twenty-four hours or once each day.

Integral with ratchet wheel 190 is a cam 193 which coacts with a cam roller 224 mounted on the upper end of a lever 202 which is loosely mounted on shaft 182. Integral with this lever 202 is an arm 200 having at its upper end a pawl 196 which serves to operate a fourteen-tooth ratchet 197 and feed it forward one tooth each day or one revolution every two weeks. The cam 185 is mounted with this ratchet 197 and revolves with it.

As the cams 191 and 193 have abrupt drops, it will be seen that the cam 185 will move intermittently and will move the abutment 177 into such successive positions as to locate the printing on the card in the proper place. The abutment will move up at the end of each day and will position the printing on the card in the next lower space. At the end of the week the abutment returns to its lowermost position and the printing will be positioned in the Monday space.

The cam 185 has two wings, each wing representing the rise and fall of the abutment for one week.

*Card receiver.*—This is shown specially in Figs. 2, 3, 4, 5, 6, 7, 9, 10 and 11. The card receiver 2 is mounted on two rods 203 and 204 and is free to slide upon them. The card receiver 2 consists of a throat piece having two openings 212, 213. Opening 213 is the "in" slot and 212 the "out" slot. When the card is inserted in the slots one edge is guided by the vertical groove 210 when the "out" slot is used, and by groove 211 when the "in" slot is used.

At the left-hand of the card receiver is pivotally connected a link 206 (Fig. 10) which has its other end attached to lever 207 which has upon it the handle 5, which projects through the case. The rearward end of lever 206 is pivoted to a bracket 209 which forms a part of the side frame 35. This handle 5 is used to shift the card receiver from a position such that the printing on the card will be in the "morning" space to a position such that the printing will be in the "afternoon" space. As shown in the drawings, the lever is at the right, which, on the case of the machine, is marked "Morning" (see Fig. 1), and the printing on the card will come to the left as shown in Fig. 20. When the handle 5 is moved to the left to the position marked "Afternoon", the printing will come to the right side of the card in the "afternoon" spaces. This lever is moved at the proper time when the first operator which wishes to use the card in the afternoon spaces, uses the machine.

*Printing hammers and mechanism.*—These are specially illustrated in Figs. 3, 4, 5, 6, 7, 10 and 13. 214 is the "in" time printing pad (see Figs. 7, 10), 215 is the "out" time printing pad, 216 the time of day and 217 the elapsed time printing pad. The "in" time pad 214, the "out" time pad 215 and the elapsed time pad 217 are mounted together in a single piece 221 yoked around the time of day printing pad holder 222 (Figs. 5, 13, 10).

The pad holder, or hammer 221 is secured to a sleeve 218 loose on shaft 223, which shaft is mounted in brackets secured to the side frames. At the right hand the sleeve 218 has an operating arm 219 the purpose of which will be hereafter described.

The time of day pad holder or hammer 222 is secured to the shaft 223. At its right-hand end is a lever 220 secured to it for operating it. At the upper end of lever 220 is pivotally secured one end of a connecting link 225 (see Fig. 3) which has its other end connected to the top of lever 226 which is pivoted to a portion of bracket 229 which forms a portion of the frame of the mechanism. Lever 226 carries cam roller 227 which bears against cam 228 which is secured to the main operating shaft 72. Each time that the handle 6 is pulled, cam 228 acting on cam roller 227 through lever 226, link 225 and arm 220, causes the shaft 223 to be rocked and the printing pad 216 to be pressed against the time of day type wheels. This occurs at each operation of the machine and at the "in" operation the pad 216 is the only one to be used, while at the "out" operation all the pads are used and a record is printed of all four sets of type wheels, as will now be described.

Pivotally mounted on the card receiver at 232 (Fig. 10) is a detector finger 231 which coacts with an abutment 230 also secured to the card receiver. Its other end 233 is pivotally fastened at 234 to a connecting link 235 having its other end secured to an arm 238 pivoted to the bracket 229 (see Fig. 10). On the same pivot stud 241 is mounted a bell crank lever 240 having attached to it a spring 239 whose other end is fastened to lever 238, and which holds arm of 240 in position in relation to lever 238, the pin 242 acting as a stop to position the lever 240. The other arm of the bell crank lever 240 carries a cam roller 243 which is operated by the crown cam 244 which is pinned to the main operating shaft 72. The connecting link 235 carries near its outer end two extensions 237, 255. Pivoted to the frame of the machine at 247 (see Fig. 3) is a lever 248 which carries at its upper end two pins 245, 246 which co-act with the extensions 237, 255. At its lower end lever 248 has a pin 249 which bears against the sloped end of lever 250 which is pivoted to the operating lever 219 at 251. The other end of lever 250 has a tooth 254 which is capable of engagement with arm 253 which forms a part of the operating lever 220 of the "time of day" printing hammer.

In its normal position, as shown in Fig. 3, pin 249 holds tooth 254 out of engagement with arm 253, the spring 252 tending to bring it into engagement. When a card is inserted in the "in" slot and the handle is pulled, the finger 231 moves into contact with the card, being operated by the cam 244, the bell crank 240 and arm 238 acting as a single bell crank lever. When arm 231 hits the card, spring 239 begins to stretch and connecting link 235 stops moving. Bell crank, 240, however, moves its entire distance. As the tooth 254 is out of contact with arm 253, only the "time of day" printing hammer is operated. If, however, the card is put in the "out" slot, the end of the card comes against the end of abutment 230 as at 255 (see Fig. 10). Now, when the machine is operated, the finger 231 instead of striking the card, passes through a hole in the abutment 230 and the spring 239 is not stretched, the levers 240 and 238 acting as a single bell crank. Under this condition, the extension 255 comes in contact with pin 245 of lever 248 and the pin 249 moves away from the sloped rear surface of lever 250 and allows the spring 252 to move the tooth 254 into engagement with arm 253 which forms a part of lever 220 pinned to the shaft 223.

When the tooth 254 is in engagement with arm 253, the "in" printing hammer, "out" printing hammer, and the elapsed time printing hammer are all operated with the "time of day" hammer, through the operation of arm 220, link 225, arm 226 and cam 228. As shown in the drawings, the card receiver is set for the morning registrations; when, however, handle 5 has been moved and card receiver 2 has been moved so as to register afternoon operations, the connecting link 235 has been moved to the left, having moved with the card receiver, because finger 231 is mounted thereon. In this position, when a card is rung "out" and all the printing hammers are used, the extension 237 comes in contact with pin 246, which is on the upper end of lever 248, and allows the tooth 254 to move into engagement with arm 253. From this it will be seen that a card put into the "in" slot will only receive a "time of day" registration, whichever the position of the card receiver, and a card put into the "out" slot will receive all four registrations.

*Ink ribbon mechanism.*—This is illustrated in Figs. 3, 7, 8, 11 and 13. On each side of the frames 35 and 36 are vertical shafts 153, 154 on which are mounted the ink ribbon spools 155, 156. The vertical shafts 153, 154 are mounted in bearings 157, 158. The ink ribbon 159 is wound on the spools 155, 156 and passes across the machine in front of the time of day, "in," "out," and elapsed time type wheels. The vertical shaft 154 has at its lower end a miter gear 160 meshing with a similar gear 161 fixed on shaft 162, which is mounted in the side frames of the machine. The other end of shaft 162 has secured to it a miter gear 163 which coacts with a miter gear 164 secured to the lower end of vertical shaft 153. The miter gears 163 and 161 are mounted on shaft 162 in such a position that if miter gear 161 meshes with miter gear 160, then miter gear 163 is out of mesh with miter gear 164. A grooved collar 165 is fixed on shaft 162. A forked lever 166 coacts with the grooved collar 165 and is pivoted at 167 to a portion of the frame. A handle 168 forming a portion of lever 166 extends through the case. On lever 166 is a pin 170 and an impositive locking spring 169 is mounted on side frame 35 and bears against pin 170. Ratchet wheel 171 is fixed on shaft 162 and is operated by a pawl 172 pivotally connected to a bell crank lever 173 pivoted to frame 36 at 174 and having at its upper end a cam roller 175 which is moved by a cam 176 fixed on the main operating handle 72.

At each operation of the machine the cam 176 rocks bell crank lever 173 on its pivot and causes the pawl 172 to feed the ratchet forward, and so rotate shaft 162. Whichever pair of miter gears are in mesh will cause the vertical shaft to move the ink ribbon across the face of the type wheels at each operation of the machine. When it is desired to reverse the direction of movement of the ribbon, the lever 168 is moved so as to throw the miter gears 160, 161 out of mesh, and the miter gears 163, 164 into mesh, and move the pin 170 into the other position on the impositive locking spring 169, and this holds the gears in their new position.

*Contact mechanism and electric circuits.—* In Figs. 16, 17 and 18 I have illustrated a preferred magnetically-controlled impulse mechanism, together with circuits adapted for use therewith, and for controlling a number of sets of "time of day" indicating wheels from a common source of power.

The clock movement 8 (see Fig. 1) has secured to the minute arbor 257 a contact disk 258 having a single tooth which coacts with two contact arms 259, 260 (Figs. 16, 18) which are pivoted to an insulating plate 261. Contact arm 259 is normally pulled downward by spring 263. Contact arm 260 is pulled downward against stop pin 262 by a similar spring. The ends of contact arms 259, 260 rest against the disk 258 and as it rotates they are gradually raised. In this position of the parts, contact arm 259 and contact point 264 of arm 260 are separated. The tooth of disk 258 passes the extreme end of 260, the latter slipping downward off the tooth and making contact between 259 and arm 264 of 260. An instant later 259 drops off the tooth again, separating 259 and 264. A momentary contact is thus made every minute.

When the tooth of disk 258 brings contacts 259 and 264 together, it closes a circuit through battery 265, cutout switch 267 and magnet 266, energizing that magnet and attracting its armature 268 against the tension of spring 271. Magnet 266 is thus momentarily energized every minute, closing contact between 268 and 273, 272 being the back stop for armature 268. This closes the circuit from battery 269 through impulse magnets 42, 44, such as are illustrated in the mechanism of the present machine. This circuit runs from battery 269, wire 274, armature 268, contact 273, wire 275, magnet 42 pivoted at 41, wire 276, magnet 44 and back to battery 269. A resistance 270 is placed in connection in the circuit with wires 275 and 274.

As shown in the drawings, the clock movement 8 and the recording mechanism, with impulse magnets 42, 44, are mounted in a single case 1, as shown in Fig. 1. The clock movement 8 and the recording mechanism may be separated a considerable distance from one another, or a single clock movement may control a plurality of recorder mechanism.

Referring to Fig. 17, 266 is a magnet energized in the manner just described, and closing a circuit through battery 269', armature 268, contact 273, wire 275, tap wire 275', magnet 44', magnet 42', tap wire 274', and wire 274 back to battery 269. At the same time the circuit of other recorders is energized. In Fig. 17 two other impulse mechanisms are shown, one magnets 42", 44" are energized through tap wires 275", 274", and another having impulse magnets energized through tap wires 275³ and 274³. Thus a common source of power, as battery 269', is made to actuate a plurality of "time of day" mechanism like the one shown in detail herein. 270', 270" and 270³ are ordinary resistances connected with tap wires 274' and 275', 274" and 275", and 274³ and 275³.

By means of my improvement a simple and efficient elapsed time recorder is provided, which is, so far as the elapsed time features are concerned, wholly under manual control. At the same time, checks or means of verification are provided, insuring an accurate operation of the machine by workmen, or immediate detection of any error.

What I claim as new and desire to secure by Letters Patent, is:

1. In an elapsed time indicating machine, the combination with a set of elapsed time recording type wheels, of levers adapted to be manually operated for moving the elapsed time recording type-wheels one way in accordance with the time of an operation of the machine, and levers adapted to be manually operated for moving said recording type-wheels the reverse way in accordance with the time of an earlier operation of the machine to cause them to indicate the elapsed time between the two operations.

2. In an elapsed time indicating machine, the combination of a set of elapsed time recording type wheels, a set of levers, one lever for each type wheel, adapted to be manually operated for moving the elapsed time recording type wheels one way in accordance with the time of an operation of the machine, and a set of levers, one lever for each type wheel, adapted to be manually operated for moving said recording type wheels the reverse way in accordance with the time of an earlier operation of the machine to cause them to indicate the elapsed time between the two operations.

3. In an elapsed time indicating machine, the combination of a set of elapsed time recording type wheels, a set of levers, one lever for each type wheel, adapted to be manually operated for moving the elapsed time recording type wheels one way in accordance with the time of an operation of the machine, a set of levers, one lever for each type wheel, adapted to be manually operated for moving said recording type wheels the reverse way in accordance with the time of an earlier operation of the machine to cause them to indicate the elapsed time between the two operations, and means adapted, in the second operation, to cause a wheel of a lower denomination to borrow one from the next higher wheel.

4. In an elapsed time indicating machine, the combination of a set of elapsed time recording type wheels, a set of floating differential wheels, one wheel for each type wheel, normally at zero, connections between each differential wheel and its corresponding type wheel adapted to move the latter one way or the other as the differential wheel is moved one way or the other, a set of levers, one lever for each differential wheel, adapted to be manually operated for moving the elapsed time type wheels in an adding direction in accordance with the time of an operation of the machine, another set of levers, one for each differential wheel, adapted to be manually operated for moving its differential wheel the reverse or subtracting way in accordance with the time of an earlier operation of the machine, and means for causing each differential wheel of lower denomination, when it falls below zero, to borrow one from the next higher differential wheel, whereby the elapsed time between the two operations of the machine may be indicated by the elapsed time type wheels.

5. In an elapsed time indicating machine, the combination of a set of elapsed time recording type wheels, a set of levers, one lever for each type wheel, adapted to be manually operated for moving the elapsed time recording type wheels one way in accordance with the time of an operation of the machine, a set of levers, one lever for each type wheel, adapted to be manually operated for moving said recording type wheels the reverse way in accordance with the time of an earlier operation of the machine to cause them to indicate the elapsed time between the two operations, and a set of time type wheels, clock-controlled, for giving a record at each operation of the machine of the true time of such operation.

6. In an elapsed time indicating machine, the combination of a set of elapsed time recording type wheels, a set of floating differential wheels, one wheel for each type wheel, normally at zero, connections between each differential wheel and its corresponding type wheel adapted to move the latter one way or the other as the differential wheel is moved one way or the other, a set of levers, one lever for each differential wheel, adapted to be manually operated for moving the elapsed time type wheels in an adding direction in accordance with the time of an operation of the machine, another set of levers, one for each differential wheel, adapted to be manually operated for moving its differential wheel the reverse or subtracting way in accordance with the time of an earlier operation of the machine, means for causing each differential wheel of lower denomination, when it falls before zero, to borrow one from the next higher differential wheel, whereby the elapsed time between the two operations of the machine may be indicated by the elapsed time type wheels, and a set of time type wheels, clock-controlled, for giving a record at each operation of the machine of the true time of such operation.

In testimony whereof, I have signed my name to this specification, in the presence of two subscribing witnesses.

JAMES WARES BRYCE.

Witnesses:
SIDNEY MANN,
EDWIN SEGER.